United States Patent Office 2,767,200
Patented Oct. 16, 1956

2,767,200

REACTION PRODUCT OF COPPER GLUCONATE AND ALKALI METAL SALT OF N-LAUROYL SARCOSIN

Gustav W. Rapp, Glen Ellyn, Ill.

No Drawing. Application September 14, 1953,
Serial No. 380,129

2 Claims. (Cl. 260—404)

This invention relates to metal-containing nitrogenous compounds, more particularly, to cupric compounds of N-lauroyl sarcosin and gluconic acid. The invention also pertains to methods of preparing the said compounds.

N-lauroyl sarcosin has the empirical formula $C_{15}H_{29}O_3N$ and the following structural formula:

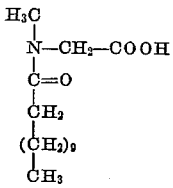

N-lauroyl sarcosin may be prepared by reacting together N-lauroyl chloride and sarcosin, according to the conventional method of forming amides by condensing amines with chlorides.

N-lauroyl sarcosin forms alkali metal salts typified by the sodium salt having the empirical formula $C_{15}H_{28}O_3NNa$ and the following structural formula:

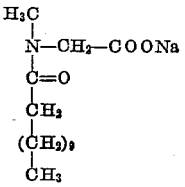

I have now prepared alkali metal salts of novel cupric compounds of N-lauroyl sarcosin and gluconic acid by reacting 1 molecule of an alkali metal salt of N-lauroyl sarcosin (such as the sodium, potassium or lithium salts) with 1 molecule of copper gluconate.

The reaction is best carried out by mixing aqueous solutions of the sodium salt of N-lauroyl sarcosin and copper gluconate. Preferably, the reactants are employed in stoichiometrical proportions, although the reaction will proceed even when one reactant is present in excess. Most suitably, the aqueous solutions of the reactants are of 0.1 molar concentration. The alkali metal salts of the novel cupric compound may then be precipitated by diluting the mixed solutions with a water miscible organic solvent such as acetone or methyl or ethyl or isopropyl alcohol.

By way of specific example, 27.1 grams of the sodium salt of N-lauroyl sarcosin dissolved in 1 liter of water may be mixed with a solution in 1 liter of water of 45.4 grams copper gluconate ($Cu(C_6H_{11}O_7)_2$). The resulting mixture may be diluted with 5 liters of acetone or isopropyl alcohol, to precipitate the sodium salt of the novel cupric compound. The corresponding potassium or lithium salts may be prepared by using appropriate amounts of potassium or lithium salts of N-lauroyl sarcosin in place of the sodium salt.

The sodium salts of the novel compound thus prepared contains 12.10% copper. It is soluble in water at pH values above 4 and below 3, being insoluble at values between 3 and 4.

An acidic compound may be prepared from any one of the above disclosed alkali metal salts by dissolving the said salts in water and reducing the pH of the solution to a value of less than 3 or 4, say, 2.5, and thereafter precipitating the acidic compound by diluting the reaction mixture with acetone or some other water miscible organic liquid, for instance, one of the above mentioned alcohols. If the pH is reduced to between 3 and 4, the acidic compound is precipitated and may be filtered off.

None of the above disclosed novel compounds has a melting point susceptible to accurate determination.

The novel compounds of this invention are excellent deodorants. For instance, one gram of any one of these compounds will practically completely eliminate the odor of one gram of thioglycolic acid dissolved in water.

Many details may be varied without departing from the principles of this invention, and it is therefore not my intention to limit the patent granted on this invention otherwise than necessitated by the scope of the appended claims.

I claim:

1. A compound comprising about 12% copper and soluble in water at pH values above about 4 and below about 3, said compound being a reaction product of aqueous solutions of copper gluconate and an alkali metal salt of N-lauroyl sarcosin.

2. A method of preparing a compound according to claim 1 which comprises mixing aqueous solutions of copper gluconate and an alkali metal salt of N-lauroyl sarcosin, diluting the resulting mixture with a water miscible organic liquid to precipitate a compound according to claim 1, and recovering the precipitated compound.

References Cited in the file of this patent

UNITED STATES PATENTS 2,047,066    Glietenberg _____ July 7, 1936